US010317103B2

(12) United States Patent
Huang

(10) Patent No.: US 10,317,103 B2
(45) Date of Patent: Jun. 11, 2019

(54) METHOD AND DEVICE FOR ADAPTIVELY REGULATING STATIC PRESSURE OF DUCTED AIR CONDITIONER AND DUCTED AIR CONDITIONER

(71) Applicants: GD MIDEA HEATING & VENTILATING EQUIPMENT CO., LTD., Foshan (CN); MIDEA GROUP CO., LTD., Foshan (CN)

(72) Inventor: Zhao Huang, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 188 days.

(21) Appl. No.: 15/500,193

(22) PCT Filed: Apr. 26, 2016

(86) PCT No.: PCT/CN2016/080240
§ 371 (c)(1),
(2) Date: Jan. 30, 2017

(87) PCT Pub. No.: WO2016/197725
PCT Pub. Date: Dec. 15, 2016

(65) Prior Publication Data
US 2017/0268794 A1 Sep. 21, 2017

(30) Foreign Application Priority Data

Jun. 9, 2015 (CN) .......................... 2015 1 0312429

(51) Int. Cl.
G06F 19/00 (2018.01)
F24F 11/30 (2018.01)
F24F 11/62 (2018.01)
G05B 19/048 (2006.01)
(Continued)

(52) U.S. Cl.
CPC .............. *F24F 11/30* (2018.01); *F24F 11/62* (2018.01); *G05B 19/048* (2013.01); *F24F 11/63* (2018.01);
(Continued)

(58) Field of Classification Search
CPC .. F24F 11/30; F24F 11/62; F24F 11/63; F24F 2110/00; F24F 2110/40; F24F 2140/50; G05B 19/048; G05B 2219/2614
See application file for complete search history.

(56) References Cited

U.S. PATENT DOCUMENTS 4,836,095 A * 6/1989 Wright, Jr. ............... F24F 11/72
454/255
6,549,826 B1 * 4/2003 Pouchak ............... G05B 13/021
700/275
(Continued)

FOREIGN PATENT DOCUMENTS

CN 103423837 A 12/2013
CN 103968500 A 8/2014
(Continued)

OTHER PUBLICATIONS

European Patent Application No. 16806623.1 extended Search and Opinion dated May 23, 2018, 7 pages.
(Continued)

*Primary Examiner* — Kidest Bahta
(74) *Attorney, Agent, or Firm* — Lathrop Gage LLP

(57) ABSTRACT

The present disclosure provides a method and a device for adaptively regulating a static pressure of a ducted air conditioner, and a ducted air conditioner. The method includes: dividing the static pressure in an air duct into a preset number of sections; selecting the sections i and i+1, and detecting respectively the gears corresponding to the sections i and i+1, the rotating speeds $R_i$ and $R_{i+1}$, and an actual
(Continued)

working currents $I_i$ and $I_{i+1}$; and judging whether $I_i$ and $I_{i+1}$ are within the normal current ranges respectively; and selecting the final section according to the judging result. With the method, the air duct conditioner may automatically select and determine a section according to actual installation environments, and may automatically determine an optimum section in which the ducted air conditioner works.

15 Claims, 4 Drawing Sheets

(51) Int. Cl.
    *F24F 11/63*     (2018.01)
    *F24F 140/50*     (2018.01)
    *F24F 110/00*     (2018.01)
    *F24F 110/40*     (2018.01)

(52) U.S. Cl.
    CPC ....... *F24F 2110/00* (2018.01); *F24F 2110/40* (2018.01); *F24F 2140/50* (2018.01); *G05B 2219/2614* (2013.01)

(56) References Cited

U.S. PATENT DOCUMENTS

| | | | |
|---|---|---|---|
| 6,719,625 B2* | 4/2004 | Federspiel | ............. B61D 27/00 |
| | | | 454/256 |
| 2008/0139105 A1* | 6/2008 | Kuentz | ................... F24F 11/77 |
| | | | 454/238 |

FOREIGN PATENT DOCUMENTS

| | | |
|---|---|---|
| CN | 104949202 A | 9/2015 |
| EP | 2525102 A2 | 11/2012 |
| EP | 2613100 A1 | 7/2013 |
| WO | WO 2010120429 A2 | 10/2010 |
| WO | WO 2013069617 A2 | 5/2013 |

OTHER PUBLICATIONS

PCT/CN2016/080240 English translation of the International Search Report and Written Opinion dated Aug. 2, 2016 9 pages.

* cited by examiner

METHOD AND DEVICE FOR ADAPTIVELY REGULATING STATIC PRESSURE OF DUCTED AIR CONDITIONER AND DUCTED AIR CONDITIONER

CROSS-REFERENCE TO RELATED APPLICATIONS

This application is a U.S. national phase application based upon International Application No. PCT/CN2016/080240, filed on Apr. 26, 2016, the entire contents of which are incorporated herein by reference.

FIELD

The present disclosure relates to the field of air conditioner technology, and more particularly to a method and a device for adaptively regulating a static pressure of a ducted air conditioner and a ducted air conditioner.

BACKGROUND

At present, for a ducted air conditioner with a large static pressure range, a manner of dividing the static pressure into a plurality of sections is used in generally. For each section, it needs to specify an air blast capacity of each gear, which is realized using a constant air blast capacity. A dial manner or a drive-by-wire manner is used to control the ducted air conditioner to work in a corresponding section when the ducted air conditioner requires a static pressure, such that each rotating speed corresponding to each gear is acquired.

A method used at present is to determine the sections manually according to an actual installation environment and to set each rotating speed corresponding to each gear by using the dial manner or the drive-by-wire manner. With the method, it is uneasy to acquire a specific static pressure of an air duct when the ducted air conditioner is actually installed. Furthermore, it is difficult to acquire an optimum section in which the ducted air conditioner works.

SUMMARY

In an embodiment, a method for adaptively regulating a static pressure of a ducted air conditioner is provided in the present disclosure. The method includes:

S1, dividing the static pressure in an air duct into a preset number of sections according to a preset rule, in which section i among the sections corresponds to a static pressure range from $P_{i-1}$ to $P_i$ and a gear corresponding to the section i, the gear corresponding to the section i corresponds to a rotating speed $R_i$ of a fan and a normal current range of $[I_{i(P(i))}, I_{i(P(i-1))}]$, in which i ranges from 1 to N, and N is a positive integer;

S2, making i=1, selecting the section i, and detecting the gear corresponding to the section i, the rotating speed $R_i$ and an actual working current $I_i$;

S3, judging whether the actual working current $I_i$ is within the normal current range of $[I_{i(P(i))}, I_{i(P(i-1))}]$, performing S4 if yes, and making i=i+1 and returning to S2 if no;

S4, calculating $a=[I_i-I_{i(P(i))}]/[I_{i(P(i-1))}-I_i]$, in which $I_i$ is the actual working current, $I_{i(P(i))}$ is a lower limit of the normal current range of $[I_{i(P(i))}, I_{i(P(i-1))}]$, $I_{i(p(i-1))}$ is an upper limit of the normal current range of $[I_{i(P(i))}, I_{i(P(i-1))}]$, and a is a ratio of current differences;

S5, selecting the section i+1 from the sections, and detecting the gear corresponding to the section i+1, the rotating speed $R_{i+1}$ and the actual working current $I_{i+1}$;

S6, judging whether the actual working current $I_{i+1}$ is within the normal current range of $[I_{(i+1)(P(i+1))}, I_{(i+1)(P(i))}]$, determining the section i as a final section if no, and performing S7 if yes;

S7, calculating $b=[I_{i+1}-I_{(i+1)(P(i+1))}]/[I_{(i+1)(P(i))}-I_{i+1}]$, in which $I_{i+1}$ is the actual working current, $I_{(i+1)(P(i+1))}$ is a lower limit of the normal current range of $[I_{(i+1)(P(i+1))}, I_{(i+1)(P(i))}]$, $I_{(i+1)(P(i))}$ is an upper limit of the normal current range of $[I_{(i+1)(P(i+1))}, I_{(i+1)(P(i))}]$, and b is the ratio of current differences; and S8, determining the section i+1 as the final section if a predetermined condition is satisfied, and determining the section i as the final section if the predetermined condition is not satisfied, in which the predetermined condition is b≥1≥a or (b≥1 and a≥1 and b>a).\

In an embodiment, the present disclosure provides a device for adaptively regulating a static pressure of a ducted air conditioner. The device includes: a non-transitory computer-readable medium comprising computer-executable instructions stored thereon; and an instruction execution system, which is configured by the instructions to implement acts of:

S1, dividing the static pressure in an air duct into a preset number of sections according to a preset rule, wherein section i among the sections corresponds to a static pressure range from $P_{i-1}$ to $P_i$ and a gear corresponding to the section i, the gear corresponding to the section i corresponds to a rotating speed $R_i$ of a fan and a normal current range of $[I_{i(P(i))}, I_{i(P(i-1))}]$, wherein i ranges from 1 to N, and N is a positive integer;

S2, making i=1, selecting the section i, and detecting the gear corresponding to the section i, the rotating speed $R_i$ and an actual working current $I_i$;

S3, judging whether the actual working current $I_i$ is within the normal current range of $[I_{i(P(i))}, I_{i(P(i-1))}]$, performing S4 if yes, and making i=i+1 and returning to S2 if no;

S4, calculating $a=[I_i-I_{i(P(i))}]/[I_{i(P(i-1))}-I_i]$, wherein $I_i$ is the actual working current, $I_{i(P(i))}$ is a lower limit of the normal current range of $[I_{i(P(i))}, I_{i(P(i-1))}]$, $I_{i(p(i-1))}$ is an upper limit of the normal current range of $[I_{i(P(i))}, I_{i(P(i-1))}]$, and a is a ratio of current differences in the section i;

S5, selecting the section i+1 from the sections, and detecting the gear corresponding to the section i+1, the rotating speed $R_{i+1}$ and the actual working current $I_{i+1}$;

S6, judging whether the actual working current $I_{i+1}$ is within the normal current range of $[I_{(i+1)(P(i+1))}, I_{(i+1)(P(i))}]$, determining the section i as a final section if no, and performing S7 if yes;

S7, calculating $b=[I_{i+1}-I_{(i+1)(P(i+1))}]/[I_{(i+1)(P(i))}-I_{i+1}]$, wherein $I_{i+1}$ is the actual working current, $I_{(i+1)(P(i+1))}$ is a lower limit of the normal current range of $[I_{(i+1)(P(i+1))}, I_{(i+1)(P(i))}]$, $I_{(i+1)(P(i))}$ is an upper limit of the normal current range of $[I_{(i+1)(P(i+1))}, I_{(i+1)(P(i))}]$, and b is the ratio of current differences in the section i+1; and S8, determining the section i+1 as the final section if a predetermined condition is satisfied, and determining the section i as the final section if the predetermined condition is not satisfied, wherein the predetermined condition is b≥1≥a or (b≥1 and a≥1 and b>a).

In an embodiment, the present disclosure provides a ducted air conditioner. The ducted air conditioner includes the device for adaptively regulating a static pressure of a ducted air conditioner.

Embodiments of the present disclosure have following beneficial effects. The ducted air conditioner may adaptively regulate the static pressure without regulating the static pressure manually.

DETAILED DESCRIPTION

Principles and features will be described in embodiments of the present disclosure referring to drawings, and examples herein are used to understand the present disclosure and are not used to limit the present disclosure.

Embodiment 1, there is a method for adaptively regulating a static pressure of a ducted air conditioner. The method will be made in detail in the embodiment in combination with FIG. 1 and FIG. 2.

Figure 1:
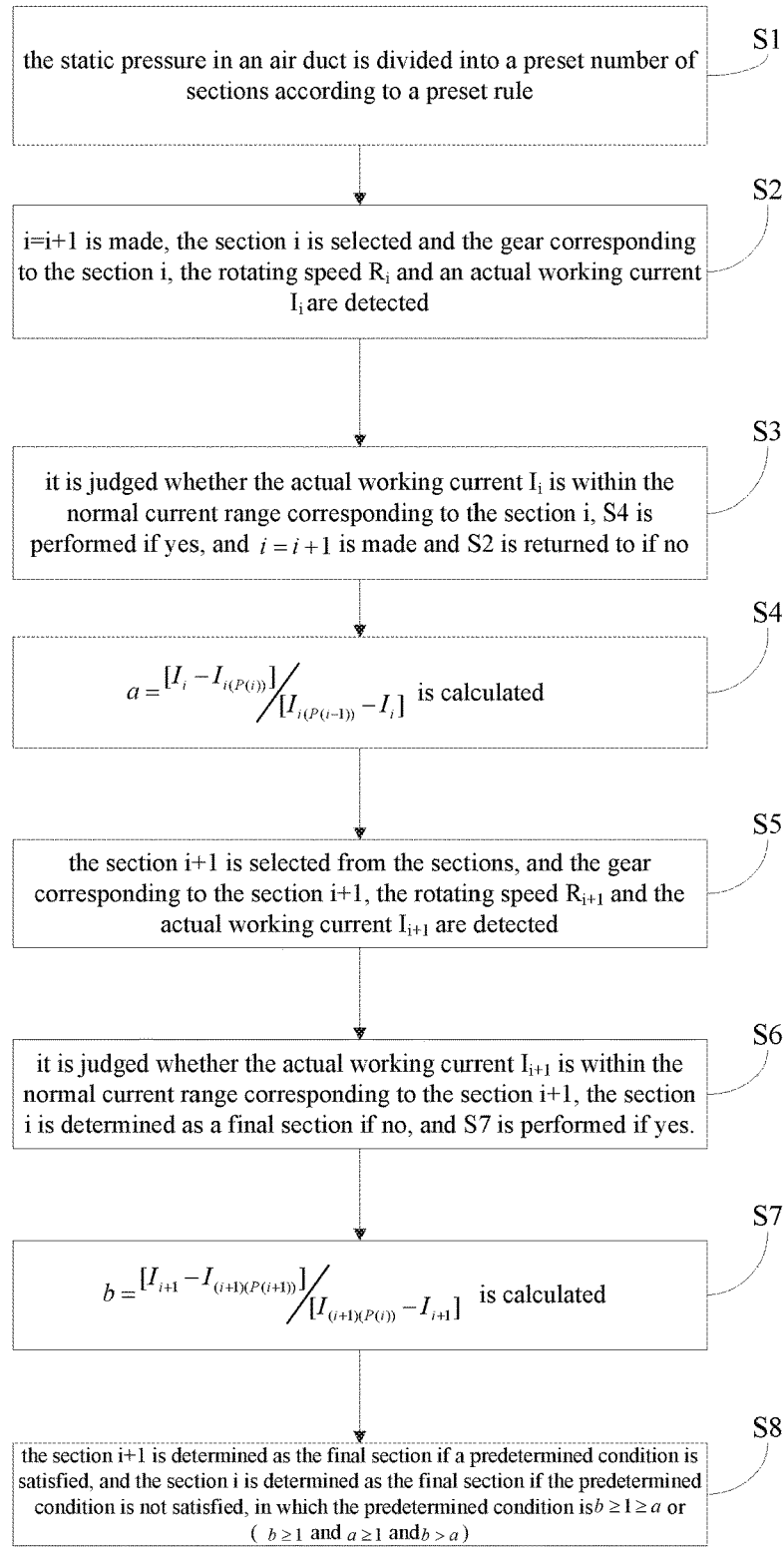
FIG. 1 is a flow chart for showing a method for adaptively regulating a static pressure according to Embodiment 1 of the present disclosure.

As shown in FIG. 1, S1, the static pressure in an air duct is divided into a preset number of sections according to a preset rule, in which section i among the sections corresponds to a static pressure range from $P_{i-1}$ to $P_i$ and a gear corresponding to the section i, the gear corresponding to the section i corresponds to a rotating speed $R_i$ of a fan and a normal current range of $[I_{i(P(i))}, I_{i(P(i-1))}]$, in which i ranges from 1 to N, and N is a positive integer.

Specifically, when the fan in the ducted air conditioner is rotating, there are different air ducts in the ducted air conditioner, and there are different static pressures. Therefore, each of the static pressures corresponding to the air duct is divided into the preset number of sections according to the preset rule, that is, the static pressure in the air duct is divided into i sections. As there are a plurality of manners of dividing the static pressure and a plurality of numbers of the sections, the division may be performed according to an actual demand. A manner of dividing the static pressure with a regular interval according to a value of the static pressure is used in the embodiment. For example, the static pressure is divided with the interval of 10 Pa or 20 Pa. It is to be illustrated that, in theory, more sections divided, higher precision of determining the section by the ducted air conditioner, and huger workloads of determining the final section. Therefore, in an actual process of dividing the static pressure, it needs to consider the precision and the workload simultaneously to reach a balance.

S2, i=1 is made, the section i is selected and the gear corresponding to the section i, the rotating speed $R_i$ and an actual working current $I_i$ are detected.

Specifically, after S1 for dividing the static pressure, the first section is selected from i sections, that is, it starts from the first section as defaulted. In the embodiment, each gear corresponding to each section i includes a super high gear, a high gear, a middle gear and a low gear. In the section i, the rotating speed $R_i$ of the fan working under the gear corresponding to the section i may be set in combination with an experiment calculation. In the section i, the rotation speed $R_i$ of the fan working under the gear corresponding to the section i is set using a constant air blast capacity in combination with the experiment calculation in the embodiment. For example, it is assumed that a current static pressure range is $[P_{i-1}, P_i]$, setting the rotating speed $R_i$ of the fan working under a selected gear (such as the high gear) corresponding to the section i in combination with the experiment calculation specifically includes followings. Using the constant air blast capacity, in the static pressure range of $[P_{i-1}, P_i]$, the rotating speed $R_i$ of the fan working in the selected gear corresponding to the section i is set in combination with the experiment calculation.

The section divided, and the rotating speed $R_i$ of the fan working in the gear corresponding to the section i may be seen as a following Table 1.

TABLE 1

|  | first section | second section | third section | fourth section | $i^{th}$ section |
|---|---|---|---|---|---|
| Static pressure (Pa) | $P_0$~$P_1$ | $P_1$~$P_2$ | $P_2$~$P_3$ | $P_3$~$P_4$ | ... $P_{i-1}$~$P_i$ |
| HH (super high gear) | $R_{1HH}$ | $R_{2HH}$ | $R_{3HH}$ | $R_{4HH}$ | ... $R_{iHH}$ |
| H (high gear) | $R_{1H}$ | $R_{2H}$ | $R_{3H}$ | $R_{4H}$ | ... $R_{iH}$ |
| M (middle gear) | $R_{1M}$ | $R_{2M}$ | $R_{3M}$ | $R_{4M}$ | ... $R_{iM}$ |
| L (low gear) | $R_{1L}$ | $R_{2L}$ | $R_{3L}$ | $R_{4L}$ | ... $R_{iL}$ |

Figure 2:
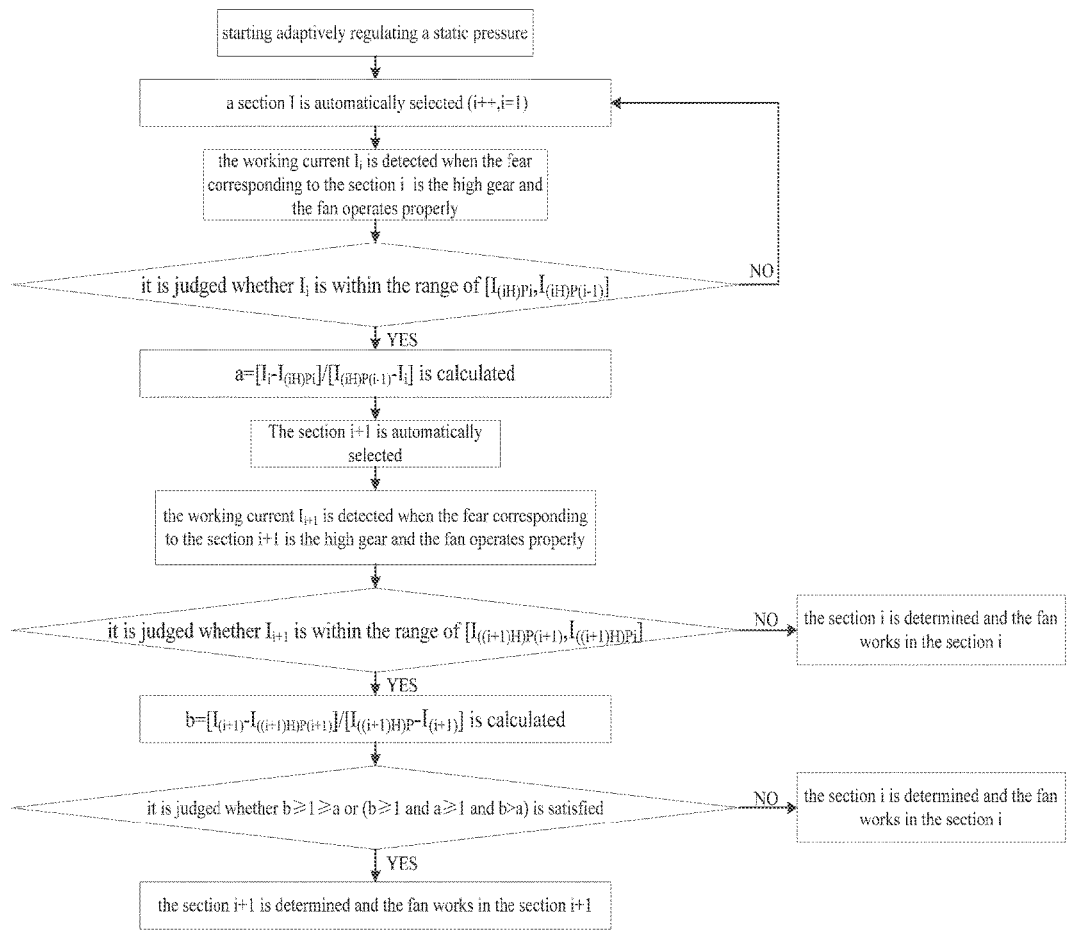
FIG. 2 is a flow chart for showing a whole operating process according to an embodiment 1 of the present disclosure.

In the section i selected, as shown in FIG. 2, the gear corresponding to the section i, the rotating speed $R_i$ and an actual working current $I_i$ are detected.

S3, it is judged whether the actual working current $I_i$ is within the normal current range of $[I_{i(P(i))}, I_{i(P(i-1))}]$, S4 is performed if yes, and i=i+1 is made and S2 is returned to if no.

Specifically, it is judged whether the actual working current $I_i$ is within the normal current range corresponding to the section i. Taking the high gear selected as an example, a correspondence among the section, the rotating speed $R_{iH}$ and the normal current range corresponding to the high gear is seen as Table 2.

TABLE 2

|  | first section | second section | third section | fourth section | $i^{th}$ section |
|---|---|---|---|---|---|
| Static pressure (Pa) | $P_0$~$P_1$ | $P_1$~$P_2$ | $P_2$~$P_3$ | $P_3$~$P_4$ | ... $P_{i-1}$~$P_1$ |
| H | $R_{1H}$ | $R_{2H}$ | $R_{3H}$ | $R_{4H}$ | ... $R_{iH}$ |
| Normal current range | $[I_{1H(P1)}, I_{1H(P0)}]$ | $[I_{2H(P2)}, I_{2H(P1)}]$ | $[I_{3H(P3)}, I_{3H(P2)}]$ | $[I_{4H(P4)}, I_{4H(P3)}]$ | ... $[I_{iH(Pi)}, I_{iH(Pi-1)}]$ |

If the fan works in the section i and works at the rotating speed $R_i$, the normal current range of $[I_{i(P(i))}, I_{i(P(i-1))}]$ is acquired by: for example, with the static pressure range of $[P_{i-1}, P_i]$ corresponding to the section i, detecting a working current $I_{i(p(i-1))}$ if the fan works at the lower limit $P_{i-1}$ of the static pressure range of $[P_{i-1}, P_i]$ and works at the rotating speed $R_i$; also detecting the working current; and determining the normal current range to be $[I_{i(P(i))}, I_{i(P(i-1))}]$ if the fan works in the section i and works at the rotating speed $R_i$. The normal current range of the fan working under the gear corresponding to each section is calculated like this. If it is judged that the actual working current $I_i$ is within the normal current range of $[I_{i(P(i))}, I_{i(P(i-1))}]$, S4 is performed; otherwise, i=i+1 is made and S2 is returned to.

S4, $a = [I_i - I_{i(P(i))}] / [I_{i(P(i-1))} - I_i]$ is calculated, in which $I_i$ is the actual working current, $I_{i(P(i))}$ is a lower limit of the normal current range of $[I_{i(P(i))}, I_{i(P(i-1))}]$, $I_{i(p(i-1))}$ is an upper limit of the normal current range of $[I_{i(P(i))}, I_{i(P(i-1))}]$, and a is a ratio of current differences.

S5, the section i+1 is selected from the sections, and the gear corresponding to the section i+1, the rotating speed $R_{i+1}$ and the actual working current $I_{i+1}$ are detected.

Specifically, similar to S2, the section i+1 is selected from the sections, and the gear corresponding to the section i+1, the rotating speed $R_{i+1}$ and the actual working current $I_{i+1}$ are detected.

It is to be illustrated that, the actual working current $I_i$ and the actual working current $I_{i+1}$ are detected when the fan operates properly. For example, the working current of the fan under a nominal voltage is detected, correspondingly, the normal current range corresponding to the section i and the normal current range corresponding to the section i+1 are calculated based on the nominal voltage. Certainly, if a current actual voltage is not the nominal voltage, the normal current range corresponding to each gear in each section may be amended under the nominal voltage according to the actual voltage to acquire the normal current range corresponding to each actual voltage. Then, it is judged using the normal current range amended.

S6, it is judged whether the actual working current $I_{i+1}$ is within the normal current range of $[I_{(i+1)(P(i+1))}, I_{(i+1)(P(i))}]$, the section i is determined as a final section if no, and S7 is performed if yes.

S7, $b=[I_{i+1}-I_{(i+1)(P(i+1))}]/[I_{(i+1)(P(i))}-I_{i+1}]$ is calculated, in which $I_{i+1}$ is the actual working current, $I_{(i+1)(P(i+1))}$ is a lower limit of the normal current range of $[I_{(i+1)(P(i+1))}, I_{(i+1)(P(i))}]$, $I_{(i+1)(P(i))}$ is an upper limit of the normal current range of $[I_{(i+1)(P(i+1))}, I_{(i+1)(P(i))}]$, and b is the ratio of current differences.

S8, the section i+1 is determined as the final section if a predetermined condition is satisfied, and the section i is determined as the final section if the predetermined condition is not satisfied, in which the predetermined condition is b≥1≥a or (b≥1 and a≥1 and b>a).

Specifically, if the predetermined condition is satisfied, in which the predetermined condition is b≥1≥a or (b≥1 and a≥1 and b>a), it means that the section i and the section i+1 may be suitable for the actual installation environment. Thus, it needs to judge whether the section i is more suitable for the actual installation environment or the section i+1 is more suitable for the actual installation environment.

A principle for performing a judgement according to the predetermined condition is as follows. If b≥1≥a, it means that the actual working current $I_{i+1}$ is close to an upper limit of the normal current range corresponding to the section i+1 in the section i+1. As the upper limit corresponds to a lower limit of the static pressure range (i.e. a lower static pressure), if b≥1, it means that an actual static pressure is closer to the lower static pressure in the section i+1. Similarly, if a≤1, it means that the actual static pressure is closer to an upper static pressure in the section i. It is concluded from the above that, the actual static pressure is in a critical range between adjacent static pressure ranges. If b≥a, it means that, the actual static pressure is closer to the lower static pressure in the section i+1 than the upper static pressure in the section i. Therefore, under such a circumstance, the section i+1 is determined as the final section. Additionally, if the section i+1 is determined as the final section, the rotating speed and the air blast capacity of the fan may be greater, thereby achieving a better effect.

Similarly, if b≥1 and a≥1 and b>a, the actual static pressure is close to the lower static pressure in the section i+1, and the actual static pressure is also close to the lower static pressure in the section i. However, if b>a, it means that the actual static pressure is more closer to the lower static pressure in the section i+1 than to the lower static pressure in the section i. Therefore, the section i+1 is determined as the final static pressure. Additionally, if the section i+1 is determined as the final section, the rotating speed and the air blast capacity of the fan may be greater, thereby achieving a better effect.

If the predetermined condition is not satisfied, in which the predetermined condition is b≥1≥a or (b≥1 and a≥1 and b>a), the section i is directly determined as the final section. After the final section is determined, the fan works in the final section.

Embodiment 2, there is a device for adaptively regulating a static pressure of a ducted air conditioner. The device provided in the embodiment of the present disclosure will be made in detail in combination with FIG. 3.

Figure 3:
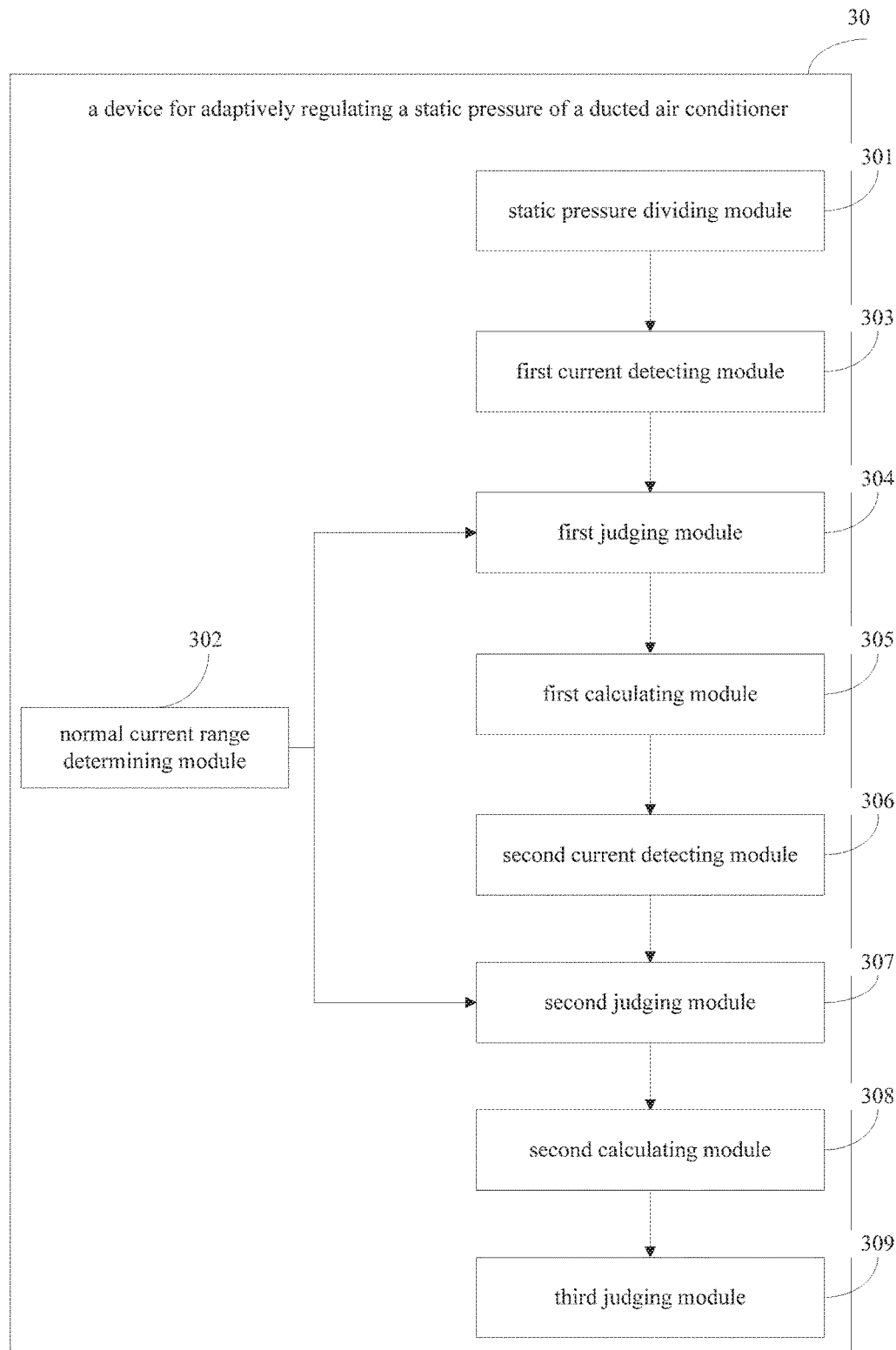
FIG. 3 is a schematic diagram illustrating a device for adaptively regulating a static pressure according to Embodiment 2 of the present disclosure.

As shown in FIG. 3, the device 30 provided in the embodiment of the present disclosure includes a static pressure dividing module 301, a normal current range determining module 302, a first current detecting module 303, a first judging module 304, a first calculating module 305, a second current detecting module 306, a second judging module 307, a second calculating module 308 and a third judging module 309.

The static pressure dividing module 301 is configured to divide the static pressure in an air duct into a preset number of sections according to a preset rule, in which section i among the sections corresponds to a static pressure range from $P_{i-1}$ to $P_i$ and a gear corresponding to the section i, the gear corresponding to the section i corresponds to a rotating speed $R_i$ of a fan and a normal current range of $[I_{i(P(i))}, I_{i(P(i-1))}]$, wherein i ranges from 1 to N, and N is a positive integer.

The normal current range determining module 302 is configured to determine the normal current range of $[I_{i(P(i))}, I_{i(P(i-1))}]$ if the fan works in the section i and works at the rotating speed $R_i$, in which the normal current range determining module is configured to:

detect a working current $I_{i(p(i-1))}$ if the fan works at the lower limit $P_{i-1}$ of the static pressure range of $[P_{i-1}, P_i]$ and works at the rotating speed $R_i$; detect the working current $I_{i(P(i))}$ if the fan works at the upper limit $P_i$ of the static pressure range of $[P_{i-1}, P_i]$ and works at the rotating speed $R_i$;

determine the normal current range to be $[I_{i(P(i))}, I_{i(P(i-1))}]$ if the fan works in the section i and works at the rotating speed $R_i$;

in which the working current $I_{i(p(i-1))}$ and the working current $I_{i(P(i))}$ are detected when the fan operates properly.

The first current detecting module 303 is configured to make i=1, to select the section i, and to detect the gear corresponding to the section i, the rotating speed $R_i$ and an actual working current $I_i$.

The first judging module 304 is configured to judge whether the actual working current $I_i$ is within the normal current range of $[I_{i(P(i))}, I_{i(P(i-1))}]$, to drive the first calculating module to perform an operation if yes, and to make i=i+1 and to drive the first current detecting module to perform an operation if no.

The first calculating module 305 is configured to calculate $a=[I_i-I_{i(P(i))}]/[I_{i(P(i-1))}-I_i]$, in which $I_i$ is the actual working current, $I_{i(P(i))}$ is a lower limit of the normal current range of $[I_{i(P(i))}, I_{i(P(i-1))}]$, $I_{i(p(i-1))}$ is an upper limit of the normal current range of $[I_{i(P(i))}, I_{i(P(i-1))}]$, and a is a ratio of current differences in the section i.

The second current detecting module 306 is configured to the section i+1 from the sections, and to detect the gear corresponding to the section i+1, the rotating speed $R_{i+1}$ and the actual working current $I_{i+1}$.

The second judging module 307 is configured to judge whether the actual working current $I_{i+1}$ is within the normal current range of $[I_{(i+1)(P(i+1))}, I_{(i+1)(P(i))}]$, to determine the section i as a final section if no, and to drive the second calculating module to perform an operation if yes.

The second calculating module 308 is configured to calculate $b=[I_{i+1}-I_{(i+1)(P(i+1))}]/[I_{(i+1)(P(i))}-I_{i+1}]$, in which $I_{i+1}$ is the actual working current, $I_{(i+1)(P(i+1))}$ is a lower limit of the normal current range of $[I_{(i+1)(P(i+1))}, I_{(i+1)(P(i))}]$, $I_{(i+1)(P(i))}$ is an upper limit of the normal current range of $[I_{(i+1)(P(i+1))}, I_{(i+1)(P(i))}]$, and b is the ratio of current differences in the section i+1.

The third judging module 309 is configured to determine the section i+1 as the final section if a predetermined condition is satisfied, and to determine the section i as the final section if the predetermined condition is not satisfied, in which the predetermined condition is $b \geq 1 \geq a$ or ($b \geq 1$ and $a \geq 1$ and $b > a$).

A static pressure regulating implementation of the device provided in the embodiment may be referred to the technical features of the above embodiment 1, which is not elaborated herein.

Embodiment 3, there is a ducted air conditioner.

Figure 4:
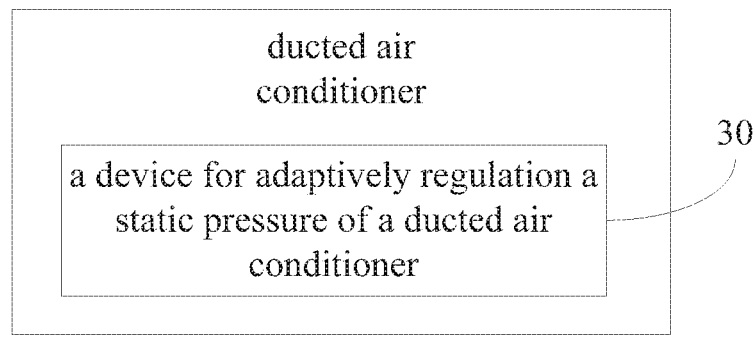
FIG. 4 is a schematic diagram illustrating a ducted air conditioner according to Embodiment 3 of the present disclosure.

As shown in FIG. 4, the ducted air conditioner provided in the embodiment includes the device 30 for adaptively regulating a static pressure of a ducted air conditioner provided in the above embodiment 2.

With the method and the device for adaptively regulating a static pressure of a ducted air conditioner and the ducted air conditioner, by dividing the static pressure in the air duct into several sections, a manner of dividing the static pressure and the number of the sections may be determined according to an actual condition and an actual demand, which has a high flexibility. The rotating speed of the fan working under the gear corresponding to the section i may be calculated using a constant air blast capacity. Additionally, in a process of selecting the section by the ducted air conditioner, the gear corresponding to the section selected is determined to calculate the rotating speed. For example, the gear corresponding to the section selected is determined as the high gear in the present disclosure. Also, the gear corresponding to the section selected may be determined as the super gear, the middle gear and the low gear, which has a high flexibility. The ducted air conditioner may automatically select and determine the optimum section according to the actual installation environment. For example, if a current static pressure is a critical value between the adjacent sections, the optimum section of the ducted air conditioner may be determined. Thus it does not need to select the section manually according to the actual installation environment and avoids that the ducted air conditioner is unable to work in the optimum condition caused by the error calculation of the static pressure.

The above embodiments are merely preferable embodiments of the present disclosure, and not construed to limit the present disclosure. Within the spirit and principle of the present disclosure, all the variants, modifications and their equivalents are comprised in the scope of the present disclosure.

It will be understood that, the flow charts, algorithms, or any process or method described herein may represent a module, segment, or portion of code that comprises one or more executable instructions to implement the specified logic function(s) or that comprises one or more executable instructions of the steps of the progress. And the scope of an embodiment of the present disclosure includes other implementations in which the order of execution may differ from that which is depicted in the flow chart, which should be understood by those skilled in the art.

The logic and steps described in the flow charts, algorithms, processes or methods may, for example, include a scheduling list of an executable instructions to implement the specified logic function(s), and can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "non-transitory computer-readable medium" can be any physical medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

The instruction execution system may for example contain a processor, a memory, and executable instructions stored in the memory for performing the various acts of the method. When executing the method, the instruction execution system may process information received from one or more sensors of the hybrid power system and/or vehicle or from parameters stored in a memory such as an information database, and may generate outputs such as information, commands, data, signals, etc. for implementing the method. These outputs may be stored in memory or applied to respective devices within the vehicle, such as appropriate actuators, etc. For example, a decision to change gears may generate a signal that commands an actuator in the transmission to shift from one gear to another gear.

Those skilled in the art shall understand that all or parts of the steps in the above exemplifying method of the present disclosure may be achieved by commanding the related hardware with programs. The programs may be stored in a non-transitory computer readable storage medium, and the programs comprise one or a combination of the steps in the method embodiments of the present disclosure when run on a computer.

In addition, each function cell of embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a non-transitory computer readable storage medium. In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

What is claimed is:

1. A method for adaptively regulating a static pressure of a ducted air conditioner, performed by a processor of the ducted air conditioner and comprising:
   S1, dividing the static pressure in an air duct into a preset number of sections i according to a preset rule, wherein each section i among the preset number of sections i corresponds to a static pressure range from $P_{i-1}$ to $P_i$ and a gear corresponding to the section i, the gear corresponding to the section i corresponds to a rotating speed $R_i$ of a fan and a normal current range of $[I_{i(P(i))}, I_{i(P(i-1))}]$, wherein i ranges from 1 to N, and N is a positive integer;
   S2, making i=1;
   S3 selecting the section i, and detecting the gear corresponding to the section i, the rotating speed $R_i$ and an actual working current $I_i$;
   S4, judging whether the actual working current $I_i$ is within the normal current range of $[I_{i(P(i))}, I_{i(P(i-1))}]$, performing S5 if yes, and making i=i+1 and returning to S3 if no;
   S5, calculating $a=[I_i-I_{i(P(i))}]/[I_{i(P(i-1))}-I_i]$, wherein $I_i$ is the actual working current, $I_{i(P(i))}$ is a lower limit of the normal current range of $[I_{i(P(i))}, I_{i(P(i-1))}]$, $I_{i(p(i-1))}$ is an upper limit of the normal current range of $[I_{i(P(i))}, I_{i(P(i-1))}]$, and a is a ratio of current differences in the section i;
   S6, selecting the section i+1 from the sections, and detecting the gear corresponding to the section i+1, the rotating speed $R_{i+1}$ and the actual working current $I_{i+1}$;
   S7, judging whether the actual working current $I_{i+1}$ is within the normal current range of $[I_{(i+1)(P(i+1))}, I_{(i+1)(P(i))}]$, determining the section i as a final section and automatically regulating the static pressure of the ducted air conditioner according to section i if no, and performing S8 if yes;
   S8, calculating $b=[I_{i+1}-I_{(i+1)(P(i+1))}]/[I_{(i+1)(P(i))}-I_{i+1}]$, wherein $I_{i+1}$ is the actual working current, $I_{(i+1)(P(i+1))}$ is a lower limit of the normal current range of $[I_{(i+1)(P(i+1))}, I_{(i+1)(P(i))}]$, $I_{(i+1)(P(i))}$ is an upper limit of the normal current range of $[I_{(i+1)(P(i+1))}, I_{(i+1)(P(i))}]$, and b is the ratio of current differences in the section i+1; and
   S9, determining the section i+1 as the final section and automatically regulating the static pressure of the ducted air conditioner according to section i+1 if a predetermined condition is satisfied, and determining the section i as the final section and automatically regulating the static pressure of the ducted air conditioner according to section i if the predetermined condition is not satisfied, wherein the predetermined condition is b≥1≥a or (b≥1 and a≥1 and b>a).

2. The method according to claim 1, wherein S1 comprises:
   dividing the static pressure in the air duct with a regular interval into the preset number of sections according to a value of the static pressure.

3. The method according to claim 1, wherein the gear corresponding to the section i and the gear corresponding to the section i+1 comprises a super high gear, a high gear, a middle gear and a low gear, and the gear corresponding to the section i in S3 is same as the gear corresponding to the section i+1 in S6.

4. The method according to claim 1, wherein if the fan works in the section i and works at the rotating speed $R_i$, the normal current range of $[I_{i(P(i))}, I_{i(P(i-1))}]$ is acquired by:
   detecting a working current $I_{i(p(i-1))}$ if the fan works at the lower limit $P_{i-1}$ of the static pressure range of $[P_{i-1}, P_i]$ and works at the rotating speed $R_i$; detecting the working current $I_{i(P(i))}$ if the fan works at the upper limit $P_i$ of the static pressure range of $[P_{i-1}, P_i]$ and works at the rotating speed $R_i$; and
   determining the normal current range to be $[I_{i(P(i))}, I_{i(P(i-1))}]$ if the fan works in the section i and works at the rotating speed $R_i$,
   wherein the working current $I_{i(p(i-1))}$ and the working current $I_{i(P(i))}$ are detected when the fan operates properly.

5. The method according to claim 1, wherein the rotating speed $R_i$ is acquired by:
   detecting the rotating speed $R_i$ if the fan works in the gear corresponding to the section i using a constant air blast capacity.

6. A device for adaptively regulating a static pressure of a ducted air conditioner, comprising:
   a non-transitory computer-readable medium comprising computer-executable instructions stored thereon; and
   an instruction execution system, which is configured by the instructions to implement acts of:
   S1, dividing the static pressure in an air duct into a preset number of sections i according to a preset rule, wherein each section i among the preset number of sections i corresponds to a static pressure range from $P_{i-1}$ to $P_i$ and a gear corresponding to the section i, the gear corresponding to the section i corresponds to a rotating speed $R_i$ of a fan and a normal current range of $[I_{i(P(i))}, I_{i(P(i-1))}]$, wherein i ranges from 1 to N, and N is a positive integer;
   S2, making i=1;
   S3 selecting the section i, and detecting the gear corresponding to the section i, the rotating speed $R_i$ and an actual working current $I_i$;
   S4, judging whether the actual working current $I_i$ is within the normal current range of $[I_{i(P(i))}, I_{i(P(i-1))}]$, performing S5 if yes, and making i=i+1 and returning to S3 if no;
   S5, calculating $a=[I_i-I_{i(P(i))}]/[I_{i(P(i-1))}-I_i]$, wherein $I_i$ is the actual working current, $I_{i(P(i))}$ is a lower limit of the normal current range of $[I_{i(P(i))}, I_{i(P(i-1))}]$, $I_{i(p(i-1))}$ is an upper limit of the normal current range of $[I_{i(P(i))}, I_{i(P(i-1))}]$, and a is a ratio of current differences in the section i;
   S6, selecting the section i+1 from the sections, and detecting the gear corresponding to the section i+1, the rotating speed $R_{i+1}$ and the actual working current $I_{i+1}$;

S7, judging whether the actual working current $I_{i+1}$ is within the normal current range of $[I_{(i+1)(P(i+1))}, I_{(i+1)(P(i))}]$, determining the section i as a final section and automatically regulating the static pressure of the ducted air conditioner according to section i if no, and performing S8 if yes;

S8, calculating $b=[I_{i+1}-I_{(i+1)(P(i+1))}]/[I_{(i+1)(P(i))}-I_{i+1}]$, wherein $I_{i+1}$ is the actual working current, $I_{(i+1)(P(i+1))}$ is a lower limit of the normal current range of $[I_{(i+1)(P(i+1))}, I_{(i+1)(P(i))}]$, $I_{(i+1)(P(i))}$ is an upper limit of the normal current range of $[I_{(i+1)(P(i+1))}, I_{(i+1)(P(i))}]$, and b is the ratio of current differences in the section i+1; and S9, determining the section i+1 as the final section and automatically regulating the static pressure of the ducted air conditioner according to section i+1 if a predetermined condition is satisfied, and determining the section i as the final section and automatically regulating the static pressure of the ducted air conditioner according to section i if the predetermined condition is not satisfied, wherein the predetermined condition is b≥1≥a or (b≥1 and a≥1 and b>a).

7. The device according to claim 6, wherein both of the gear corresponding to the section i and the gear corresponding to the section i+1 comprise a super high gear, a high gear, a middle gear and a low gear, and the gear corresponding to the section i in S3 is same as the gear corresponding to the section i+1 in S6.

8. The device according to claim 6, wherein the instruction execution system is further configured by the instructions to implement acts of:

detecting a working current $I_{i(p(i-1))}$ if the fan works at the lower limit $P_{i-1}$ of the static pressure range of $[P_{i-1}, P_i]$ and works at the rotating speed $R_i$; detecting the working current $I_{i(P(i))}$ if the fan works at the upper limit $P_i$ of the static pressure range of $[P_{i-1}, P_i]$ and works at the rotating speed $R_i$; and determining the normal current range to be $[I_{i(P(i))}, I_{i(P(i-1))}]$ if the fan works in the section i and works at the rotating speed $R_i$, wherein the working current $I_{i(p(i-1))}$ and the working current $I_{i(P(i))}$ are detected when the fan operates properly.

9. The device according to claim 8, wherein the rotating speed $R_i$ is acquired by:

detecting the rotating speed $R_i$ if the fan works in the gear corresponding to the section i using a constant air blast capacity.

10. A ducted air conditioner, comprising:

the device for adaptively regulating a static pressure of a ducted air conditioner, wherein the device comprises:

a non-transitory computer-readable medium comprising computer-executable instructions stored thereon; and an instruction execution system, which is configured by the instructions to implement acts of:

S1, dividing the static pressure in an air duct into a preset number of sections i according to a preset rule, wherein each section i among the present number of sections i corresponds to a static pressure range from $P_{i-1}$ to $P_i$ and a gear corresponding to the section i, the gear corresponding to the section i corresponds to a rotating speed $R_i$ of a fan and a normal current range of $[I_{i(P(i))}, I_{i(P(i-1))}]$, wherein i ranges from 1 to N, and N is a positive integer;

S2, making i=1;

S3, selecting the section i, and detecting the gear corresponding to the section i, the rotating speed $R_i$ and an actual working current $I_i$;

S4, judging whether the actual working current $I_i$ is within the normal current range of $[I_{i(P(i))}, I_{i(P(i-1))}]$, performing S5 if yes, and making i=i+1 and returning to S3 if no;

S5, calculating $a=[I_i-I_{i(P(i))}]/[I_{i(P(i-1))}-I_i]$, wherein $I_i$ is the actual working current, $I_{i(P(i))}$ is a lower limit of the normal current range of $[I_{i(P(i))}, I_{i(P(i-1))}]$, $I_{i(p(i-1))}$ is an upper limit of the normal current range of $[I_{i(P(i))}, I_{i(P(i-1))}]$, and a is a ratio of current differences in the section i;

S6, selecting the section i+1 from the sections, and detecting the gear corresponding to the section i+1, the rotating speed $R_{i+1}$ and the actual working current $I_{i+1}$;

S7, judging whether the actual working current $I_{i+1}$ is within the normal current range of $[I_{(i+1)(P(i+1))}, I_{(i+1)(P(i))}]$, determining the section i as a final section and automatically regulating the static pressure of the ducted air conditioner according to section i if no, and performing S8 if yes;

S8, calculating $b=[I_{i+1}-I_{(i+1)(P(i+1))}]/[I_{(i+1)(P(i))}-I_{i+1}]$, wherein $I_{i+1}$ is the actual working current, $I_{(i+1)(P(i+1))}$ is a lower limit of the normal current range of $[I_{(i+1)(P(i+1))}, I_{(i+1)(P(i))}]$, $I_{(i+1)(P(i))}$ is an upper limit of the normal current range of $[I_{(i+1)(P(i+1))}, I_{(i+1)(P(i))}]$, and b is the ratio of current differences in the section i+1; and S9, determining the section i+1 as the final section and automatically regulating the static pressure of the ducted air conditioner according to section i+1 if a predetermined condition is satisfied, and determining the section i as the final section and automatically regulating the static pressure of the ducted air conditioner according to section i if the predetermined condition is not satisfied, wherein the predetermined condition is b≥1≥a or (b≥1 and a≥1 and b>a).

11. The ducted air conditioner according to claim 10, wherein both of the gear corresponding to the section i and the gear corresponding to the section i+1 comprise a super high gear, a high gear, a middle gear and a low gear, and the gear corresponding to the section i in S3 is same as the gear corresponding to the section i+1 in S6.

12. The ducted air conditioner according to claim 10, wherein the instruction execution system is further configured by the instructions to implement acts of:

detecting a working current $I_{i(p(i-1))}$ if the fan works at the lower limit $P_{i-1}$ of the static pressure range of $[P_{i-1}, P_i]$ and works at the rotating speed $R_i$; detecting the working current $I_{i(P(i))}$ if the fan works at the upper limit $P_i$ of the static pressure range of $[P_{i-1}, P_i]$ and works at the rotating speed $R_i$; and determining the normal current range to be $[I_{i(P(i))}, I_{i(P(i-1))}]$ if the fan works in the section i and works at the rotating speed $R_i$, wherein the working current $I_{i(p(i-1))}$ and the working current $I_{i(P(i))}$ are detected when the fan operates properly.

13. The ducted air conditioner according to claim 12, wherein the rotating speed $R_i$ is acquired by:

detecting the rotating speed $R_i$ if the fan works in the gear corresponding to the section i using a constant air blast capacity.

14. The ducted air conditioner according to claim 10, wherein the instruction execution system is further configured by the instructions to implement the acts of:

dividing the static pressure in the air duct with a regular interval into the preset number of sections according to a value of the static pressure.

15. The device according to claim 6, wherein the instruction execution system is further configured by the instructions to implement the acts of:
dividing the static pressure in the air duct with a regular interval into the preset number of sections according to a value of the static pressure.

\* \* \* \* \*